Figure 1:
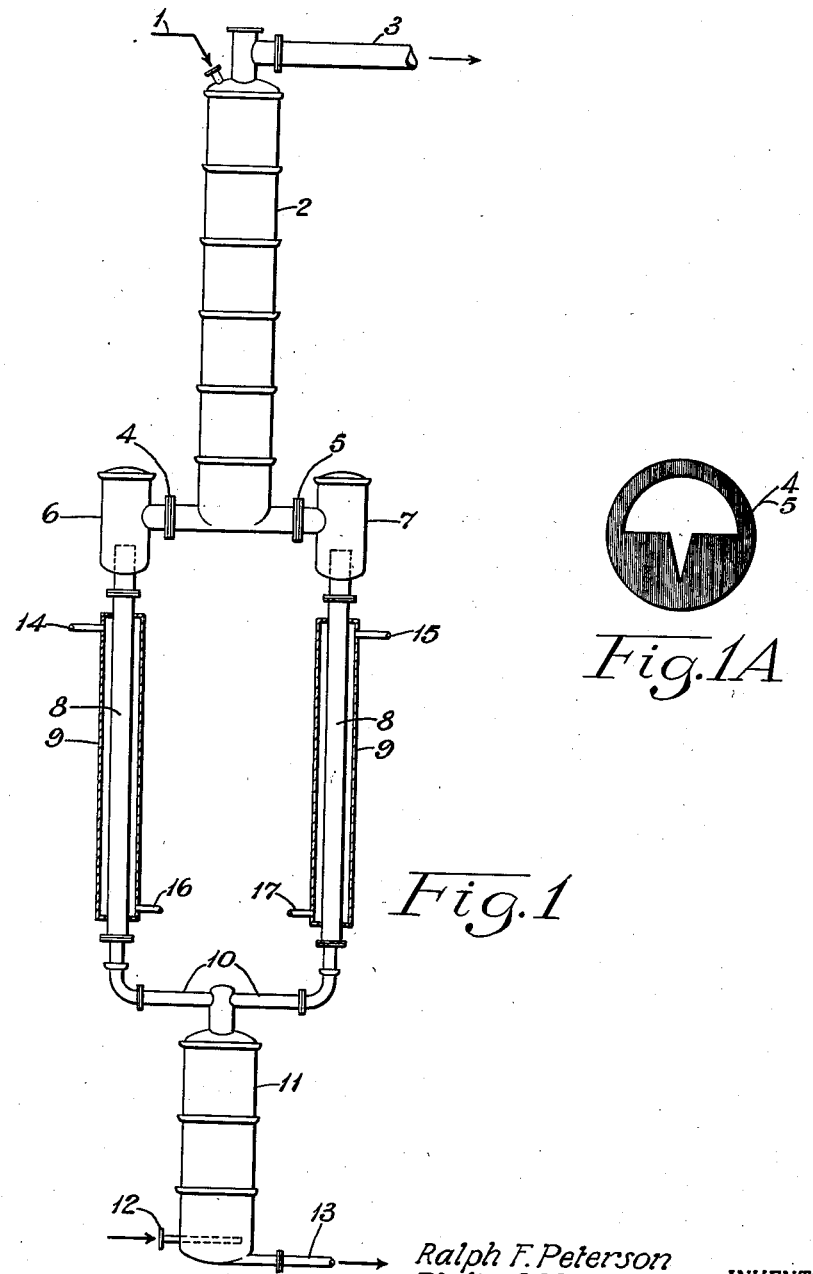

Patented May 21, 1940

2,201,631

UNITED STATES PATENT OFFICE 2,201,631

NITRIC ACID CONCENTRATION

Ralph F. Peterson, Woodbury, N. J., and Philip G. Wrightsman, Chester, Pa., assignors to E. I. du Pont de Nemours & Company, Wilmington, Del., a corporation of Delaware Application May 14, 1938, Serial No. 207,896

2 Claims. (Cl. 23—160)

This invention relates to a process for concentrating nitric acid, and more particularly to an improved continuous process and apparatus for carrying out the step of denitrating residual solutions of dehydrating agents in the concentration of nitric acid.

This case is a continuation-in-part of our copending application, Serial No. 738,948, filed August 8, 1934.

The concentration of weak nitric acid is an important industrial process, since substantially anhydrous mixed acids are required for many nitration operations, while the spent nitrating acids are relatively low in nitric acid content. For the concentration of such acids the use of a dehydrating agent is necessary. Sulfuric acid has been the most commonly used agent for this purpose, though other materials have been suggested, such as phosphoric acid, arsenic acid, calcium nitrate, and the like.

Because of its excellent dehydrating properties and its economic availability, sulfuric acid has been the agent employed in substantially all methods in practical use for the concentration of nitric acid. The magnitude of such concentration operations has been so great that continual efforts have been put forth to bring about improvements in the process. Among the methods proposed with this object in view have been those of Pauling, in U. S. Patent 1,031,865; Kaltenbach (French Patent 594,865); Davis, Handforth and Kirst (U. S. Patent 1,922,278); Handforth (U. S. Patent 1,922,289); Zeisberg (U. S. Patent 1,928,749); and many others. In the various methods of the art many disadvantages exist, such as inefficiency through introduction of steam which must later be removed, complicated apparatus requirements, the necessity for high-pressure steam for evaporation purposes, failure to bring about satisfactory heat exchange in the concentration apparatus, and many others.

The object of our invention is an improved process for the concentration of dilute nitric acid, utilizing a dehydrating agent. A further object is such a process in which there is no dilution of the dehydrating agent by the introduction of water vapor into the process from external sources. A still further object is a process in which the maximum heat exchange effect is obtained. A still further object is an improved and more efficient apparatus for carrying out our process. Additional objects will be disclosed as the invention is described more fully hereinafter.

We have found that the foregoing objects are attained and disadvantages overcome by means of our invention, which comprises causing the substantially spent dehydrating agent containing nitric acid to flow in a condition of high surface exposure, for example, in the form of a thin layer or film, down over the inner surface of a substantially vertical tube which is heated externally.

Although the vertical evaporating tubes by themselves are sufficient for bringing about the production of a concentrated nitric acid, if a large enough quantity of dehydrating agent is used and very high temperatures, we prefer to employ the tubes in conjunction with a preliminary dehydrating tower or vessel, thereby making economical operation possible. Preferably, also, a second fractionating or denitrating tower will follow the vertical boiling tubes, and the last traces of nitric acid will be removed in this second tower. The nitric vapors given off from the second fractionating tower, and from the vertical boiling tubes, desirably are returned to the dehydrating tower. The return of the nitric acid vapors will preferably be through the vertical tubes, though separate vapor returning devices may be provided if desired. An important feature, also, is the fact that in the most preferred embodiment the dehydrating tower is connected to more than one vertical boiling tube, so that the solution for denitration passes in parallel flow through the various vertical tubes. If a second fractionating tower is employed, these tubes, adapted for parallel flow, serve to connect the dehydrating and the denitrating towers.

In carrying out our process in its preferred form, we introduce a mixture of dilute nitric acid and a dehydrating agent into the top of a dehydrating tower. This mixture becomes heated by the hot vapors entering at the bottom, and concentrated nitric acid leaves at the top of the tower. The diluted dehydrating agent leaves the tower at the bottom and passes to more than one externally heated vertical tube, down over the inner surface of which the acid flows in the form of a thin layer or film. These tubes are arranged so that simultaneous parallel flow of acid takes place through the tubes. In this way a considerable degree of denitration of the residual acid is effected, nitric acid and water vapor being evolved and passing up into the dehydrating tower. If a sufficiently high temperature of heating medium is used for the vertical tubes, the denitration will be complete. We consider it desirable, however, to use lower pressure steam as the heating medium and to remove the last trace of nitric acid from the residual acid by passing this from the tubes through a second denitrating fractionating tower, from which, also, the vapors evolved may pass to the bottom of the dehydrating tower.

In order to describe our invention more clearly, reference is made to the accompanying drawings, which illustrate suitable equipment for carrying out the process thereof. It is to be understood, however, that this is done solely by way of illustration and is not to be regarded as a limitation upon the scope of our invention. Similar numerals will be employed throughout the several figures of the drawings to denote corresponding parts.

Figure 2:
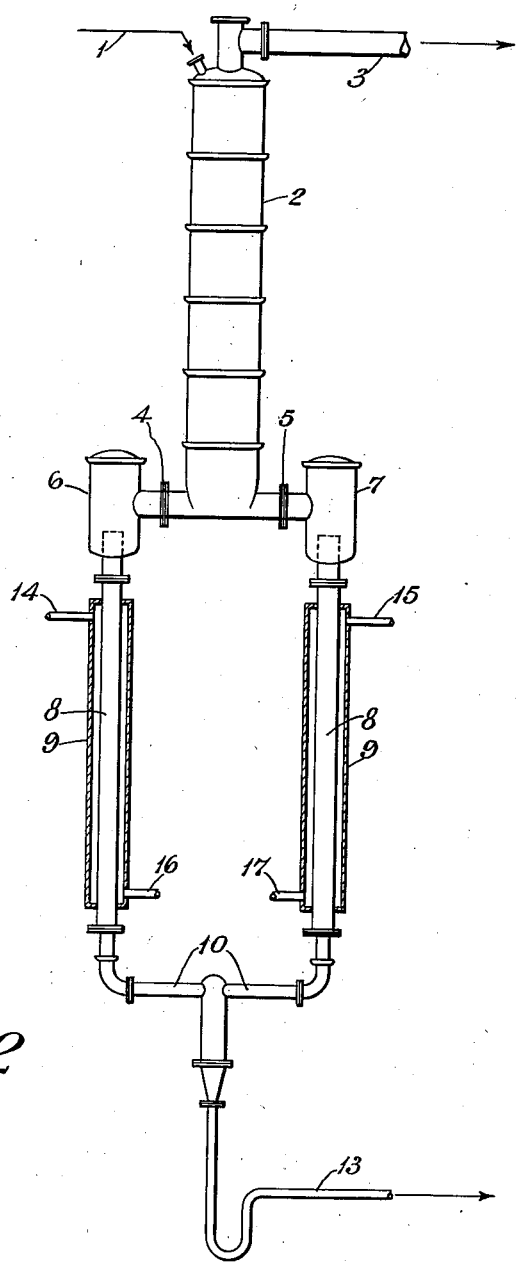

Referring generally to the drawings, Figure 1 is a diagrammatic sketch of the apparatus of our invention including dehydrating tower, vertical evaporating tubes and denitrating tower. Figure 1A is the plan of the notched weir. It serves to promote uniform distribution of acid to the tubes. Figure 2 is a similar sketch of a different embodiment including the dehydrating tower and the tubes in the absence of the denitrating tower.

Referring in greater detail to the various figures of the drawings, in Figure 1, dilute nitric acid together with sulfuric acid or other dehydrating agent is fed in at the top of the dehydrating tower 2 through inlet 1. As the mixture flows downward and is met by the ascending hot gases, strong nitric acid vapors are given off at the top of the tower. These can pass through 3 to the usual bleaching and condensing equipment. From the dehydrating tower the acid flows in parallel streams through weirs 4 and 5 to distributing boxes 6 and 7 where it reaches a level uniform with the tops of the emergent vertical tubes 8. The acid then flows down over the inner surface of these tubes in the form of a thin film. The tubes are surrounded by individual heating jackets 9, preferably containing steam at a pressure of around 150 lbs. The vapors of nitric acid and water pass up through 4 and 5 into the dehydrating tower. The residual acid flows out through 10, thence into the denitrating tower 11. This acid still contains a small amount of nitric acid which is completely removed in 11. Live steam is introduced into 11 through 12 and the vapors from 11 pass to the bottom of the dehydrating tower 2 through tubes 8. Residual acid is drawn off at 13. It will be seen that the acid passes in parallel flow from the dehydrating tower 2 to the vertical tubes, and thence to denitrating tower 11. Parallel flow of vapors back to the dehydrating tower is likewise provided for. The heating agent for the tubes passes through conduits 14, 15, 16 and 17.

Figure 1A shows the design of the notched weir, such as is preferably used at 4 and 5 in Figure 1. These weirs serve to promote uniform distribution of the acid leaving the bottom of dehydrating tower 2 to vessels 6 and 7 and tubes 8.

Figure 2 represents a process similar to that illustrated in Figure 1, except that the denitration takes place entirely in the dehydrating tower 2 and the vertical boiling tubes 8. The tubes are again surrounded by individual heating jackets 9. With no denitrating tower, a higher temperature is required in the heating jackets and preferably high pressure steam is used, for example at 200 lbs. The residual acid leaving the concentration system may vary considerably in strength, for example 68 to 73% $H_2SO_4$, depending on the presence or absence of a denitrating tower, temperature of heating medium, etc.

In the foregoing description of our process we have used sulfuric acid as dehydrating agent, and this will be the one commonly used. We may, however, utilize other dehydrating materials, provided they are capable of flow. It will be necessary, of course, that the apparatus be constructed of acid-resisting materials, and the dehydrating tower, evaporating tubes and denitrating tower may with advantage be made of high-silicon iron alloys, for example. In the drawings two evaporating tubes are shown adapted for parallel flow, but it will be apparent that we may employ any plurality of such tubes, depending on the desired capacity of the installation. For example, we have found four tubes to comprise a satisfactory unit for use with one dehydrating tower. Preferably the tubes will be of relatively large diameter, for example eight inches. The tops of all the vertical tubes can with advantage be so constructed that the formation of a uniform film of liquid is facilitated with serrated or notched edges, for example.

In the foregoing detailed description of our invention we have described the use of steam as the heating agent. It should be understood, however, that other such agents may be used in lieu of steam, for example, mercury vapor, diphenyl, diphenyl oxide and the like.

The process as described in the foregoing and the apparatus therefor offers many advantages not present in the methods of the art. The removal of nitric acid from the dehydrating agent by this downflowing film method has the advantage over the use of other types of boiling vessels partly filled with acid, that a much more efficient heat exchange results. According to our method the liquid is in contact in finely divided condition with the entire inner surface of the hot tubes, whereas in the case of previous types of vessels, for example horizontal tubes, the liquid has been in contact with only the lower half of the surface of the vessel or tube. Thus the use of vertical boiling tubes increases the capacity of the apparatus for a given volume of evaporating vessels. For example, two vertical boiling tubes have the same heat transfer capacity as four horizontal tubes of the same size because of the increased utilization of the hot surface area of the tubes. Due to the parallel arrangement and the fact that the greater part of the tube volume is unoccupied, the vapor velocity is reduced, for a given amount of evaporation.

In this way, vapor surging and liquid acid entrainment is eliminated, with consequent increased efficiency.

We have described in the foregoing the method and apparatus preferred for carrying out our invention. It will be understood, however, that many details in operation and construction may be varied without departure from the scope of our invention. We intend to be limited, therefore, only by the following patent claims:

We claim:

1. An apparatus for the concentration of aqueous solutions of nitric acid, which comprises a dehydrating tower and more than one vertical tube of acid-resistant material, a jacketing means surrounding each of said vertical tubes individually and adapted to contain a heating medium out of contact with the acid solution, a distributing chamber at the top of each of said tubes for maintaining a substantially constant flow of the acid solution in the form of a thin layer down and over the inner surfaces of said tubes and means for allowing the flow of the acid solution from the dehydrating tower to the distributing chambers for the tubes and for conveying the vapors from the tubes to said tower, said vertical tubes being so arranged with respect to one another as to permit parallel flow of acid simultaneously down through the various tubes.

2. The process of concentrating nitric acid, which comprises passing a mixture of nitric acid and a dehydrating agent down through a dehydrating tower of acid-resistant material, driving off nitric acid vapors therefrom, distributing the residual liquid admixture in a substantially constant flow in the form of a thin layer down and over the inner surfaces of a plurality of heated vertical tubes, supplying heat to each of said tubes by individual heating means, permitting the parallel flow of said liquid simultaneously down through the various tubes, driving off vapors from said liquid in said tubes and conveying said vapors from said tubes back to said dehydrating tower, permitting the same to ascend through said tower.

RALPH F. PETERSON.
PHILIP G. WRIGHTSMAN.